United States Patent [19]

Fruth et al.

[11] Patent Number: 4,673,815
[45] Date of Patent: Jun. 16, 1987

[54] METHOD OF AUTOMATICALLY DETECTING THE LOCATIONS OF THE FRAME LINES OF A REVERSAL FILM AND APPARATUS FOR CARRYING OUT THE METHOD

[75] Inventors: Rupert Fruth; Gottfried Stemmer, both of Garmisch-Partenkirchen; Claus Pohl, Eschenlohe, all of Fed. Rep. of Germany

[73] Assignee: Geimuplast Peter Mundt GmbH. & Co. KG., Farchant, Fed. Rep. of Germany

[21] Appl. No.: 777,924

[22] Filed: Sep. 19, 1985

[30] Foreign Application Priority Data

Oct. 8, 1984 [DE] Fed. Rep. of Germany ....... 3436874

[51] Int. Cl.⁴ .................... G01N 21/86; G03B 1/00
[52] U.S. Cl. ................................ 250/548; 354/215
[58] Field of Search ............... 250/548; 354/212, 213, 354/215

[56] References Cited

U.S. PATENT DOCUMENTS 4,084,099 4/1978 Harvey et al. ................. 250/548

FOREIGN PATENT DOCUMENTS 1285317 12/1968 Fed. Rep. of Germany .
1797439 9/1971 Fed. Rep. of Germany .

Primary Examiner—Gene Wan
Attorney, Agent, or Firm—Fleit, Jacobson, Cohn & Price

[57] ABSTRACT

A method of automatically detecting the locations of the frame lines of a reversal film as it is supplied to a processing station, such as a cutting and mounting station, a notching station or the like, so that the frame lines can be used as reference marks for the positioning of the film in the processing station wherein the film is moved past optoelectronic scanner in steps which amount to only a fractional part of the normal width of a frame line. The scanner generates an analog voltage which represents the accumulated light transmission of the film in a scanned area, which extends at right angles to the direction of travel of the film substantially across the picture area of the film and has a width which is only a fractional part of a normal width of a frame line. The extreme value of the voltage obtained during a scanning of at least one normal frame length and corresponding to the lowest light transmission is evaluated as a representation of the light transmission of the scanned film at a frame line. This evaluation is so improved that a confusion between frame lines and framelinelike picture elements will be reliably precluded. The analog voltage is digitalized and the digital data obtained for each step of travel are stored for an interval of time which corresponds to the travel over a plurality of frame lengths. The stored digital data are compared over time with each other and those digital data which represent the extreme voltage value are regarded as being associated with a frame line if the number of such data which occur in an uninterrupted sequence corresponds to a frame line width, with a predetermined tolerance allowance, and are regarded as being associated with an unexposed frame area if a larger number of such data occur in an uninterrupted sequence.

8 Claims, 1 Drawing Figure

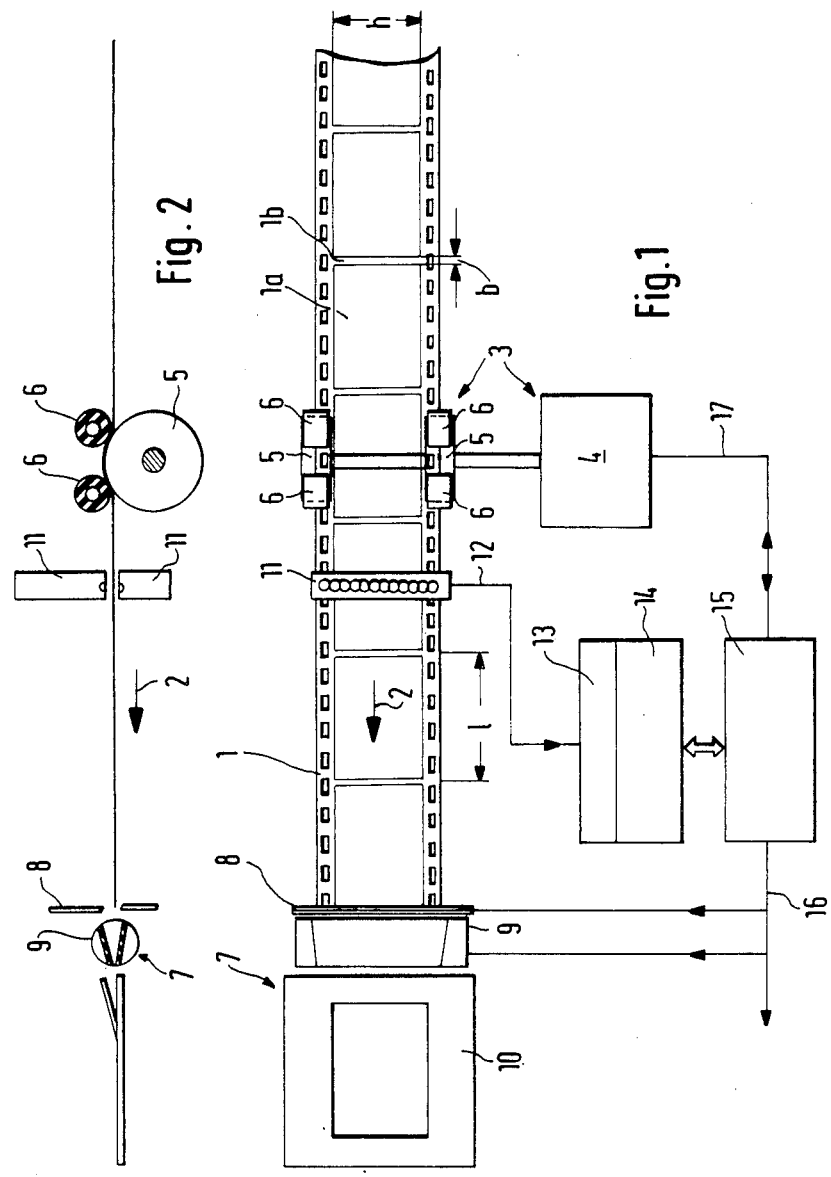

METHOD OF AUTOMATICALLY DETECTING THE LOCATIONS OF THE FRAME LINES OF A REVERSAL FILM AND APPARATUS FOR CARRYING OUT THE METHOD

BACKGROUND OF THE INVENTION

1. Field of the Invention

This invention relates to a method of automatically detecting the locations of the frame lines of a reversal film as it is supplied to a processing station, such as a cutting and mounting station, a notching station or the like, so that the frame lines can be used as reference marks for the positioning of the film in the processing station, wherein the film is moved past optoelectronic scanning means in steps which amount to only a fractional part of the normal width of a frame line, said optoelectronic scanning means generate an analog voltage which represents the accumulated light transmission of the film in a scanned area which extends at right angles to the direction of travel of the film substantially across the picture area of the film and has a width which is only a fractional part of a normal width of a frame line, and the extreme value of said voltage obtained during a scanning of at least one normal frame length and corresponding to the lowest light transmission is evaluated as a representation of the light transmission of the scanned film at a frame line.

DESCRIPTION OF THE PRIOR ART

Apparatus for carrying out such a method are known from Published German Applications Nos. 14 97 389 and 17 97 439.

In the apparatus known from published German Application No. 14 97 389 the analog voltages delivered by the optoelectronic means are subjected to analog processing. For the handling of negative films, the first drop of the light transmission after a light transmission peak is regarded as an indication of a frame edge between a frame and a frame line. It is assumed that the maximum light transmission within a film length corresponding to a frame length can occur only at the frame line between two frames. In order to define the location of that edge which separates that frame line from the frame, it is assumed that at least when the negative frames can be printed the density at the very edge of the frame will exceed by at least, e.g., 3% the density in the frame line. But that assumption is not always correct and in that case the apparatus in accordance with said published German application will not be able to perfectly detect and center the frame edge. This is also applicable to reversal films, in which the frame lines are detected as the loci at which the photoelectrically detected light transmission reaches a minimum during an interval of time corresponding to a frame length and the first location at which a rise of the light transmission is detected is regarded as the leading edge of a frame.

In order to permit a more reliable detection of frame lines it has been taught in Published German Application No. 17 97 439 to provide the apparatus in accordance with Published German Application No. 14 97 389 with means for scanning the film at a second location and for detecting the trailing edge of each frame in response to a predetermined minimum drop or rise of the light transmission. In that case the analog voltage delivered by the optoelectronic means is also subjected to analog processing.

Because the signals are subjected to analog processing in the two apparatus described hereinbefore, said apparatus are expensive and are also liable to be deranged. A particularly high expenditure will be involved in the provision of the second scanning means in accordance with Published German Application No. 17 97 439. Besides, said two known apparatus are unable to reliably distinguish between the frame lines and any framelinelike picture elements in the frames, such as pictures of black posts, so that indication errors may occur even if the second scanning means have been provided in accordance with Published German Application No. 17 97 439.

SUMMARY OF THE INVENTION

The object underlying the invention is to provide a method which is of the kind described first hereinbefore and which is so improved that a confusion between frame lines and framelinelike picture elements will be reliably precluded and which can be carried out with apparatus which is uncomplicated and troubleproof.

This object is accomplished in that (a) the analog voltage is digitalized by means of an analog-to-digital converter, and the digital data obtained for each step of travel are stored for an interval of time which corresponds to the travel over a plurality of frame lengths, and (b) the digital data which are stored at a time are compared with each other and those digital data which represent the extreme voltage value are regarded as being associated with a frame line if the number of such data which occur in an uninterrupted sequence corresponds to a frame line width, with a predetermined tolerance allowance, and are regarded as being associated with an unexposed frame area if a larger number of such data occur in an uninterrupted sequence.

Because a digitalization is effected in the method in accordance with the invention the signal stream delivered by the analog-to-digital converter will always permit a reliable distinction to be made between data which might be associated with a frame line and data which might represent a frameline like picture element within a frame because the highest light transmission within the frame will always differ, although possibly only by a small amount, from the light transmission of the frame line, which will always be higher than the highest light transmission which can occur within a frame. That distinction will reliably be maintained as the signals are processed further. Because the invention calls for a storage of the digital data obtained by the scanning of a plurality of normal frame lengths so that such data can be compared with each other in a simple manner, and because the number of digital data which represent extreme voltage values and occur in an uninterrupted sequence is taken into account in the evaluation, a reliable distinction between unexposed frame areas and frameline areas on the film will be ensured. The light transmission of overexposed areas of the film will differ considerably from the extreme light transmission values which may occur in frame lines. For this reason such film areas can be clearly detected as such even if they extend over more of that length of travel of the film which has been defined by data. Low-cost integrated circuits which have been known for a long time are available for the digital detection and further processing of the signals which are delivered by the optoelectronic scanning means and by clocks for controlling the travel of the film and the use of such circuits will permit the method in accordance with the invention to be carried out with apparatus representing only a very low expenditure.

Dependent claims 2 to 6 define preferred embodiments of the method defined in claim 1.

If, in accordance with claim 2, the location of each frame line on the film is determined by a processing of data representing the time of the measurement, the interval of time between the occurrences of digital data groups associated with respective frame lines, and the length over which the film has traveled in the meantime, the data obtained by the detection of frame lines can be used for a detection of frame lines which have not been detected by the optoelectronic means, e.g., because said frame liness are too narrow, or for a determination of the usable length of frames which slightly overlap so that there is no frame line between them.

In accordance with claim 3 only those analog voltages are digitalized which lie in a range defined by upper and lower limits and said range is so selected that the extreme voltages corresponding to a normal light transmission of a frameline will lie in said range and will differ from said limits. An advantage afforded by said measure resides in that only voltages are digitalized and processed which lie in that light transmission range which is significant for the detection of frame lines. For this reason even a lower-grade analog-to-digital converter will provide the fine gradation which is required for the detection of the relatively small differences between the light transmission of a frame line and the highest light transmission in a frame area having an adequate resolution. Because only the data corresonding to that light transmission range must be processed further by the succeeding data-processing means, which may comprise a microprocessor or the like, the requirements to be met by said data processing means are also reduced.

The various makes of film of a certain type usually differ only slightly from each other and the influence of slightly different developing processes is small too so that said variations can be allowed for by the provision of a defined voltage range. The conditions may be different when different types of films are concerned, such as films exposed in a camera and printed films. The differences will be greater in such case and for that case an adjustment of the voltage range is contemplated, as is defined in claim 4.

A lack of any light transmission will result in a distinct difference from the extreme light transmission values for frame lines also as regards the corresponding analog voltages and the digital data derived therefrom. There is no light transmission at all, e.g., at the splices between two films. Because a stuck-on label bearing the number of the film is usually provided there and although it has no light transmission at all might simulate an extreme value of light transmission suggesting a frame line, it is recommendable to separately detect the absence of light transmission only for film areas disposed near the edges of the film, as is defined in claim 5. It will also be desirable so to define the voltage range that the analog voltage corresponding to zero light transmission lies outside said range.

The invention relates also apparatus for carrying out the method outlined hereinbefore. That apparatus comprises (a) a film transport mechanism for longitudinally advancing the film in steps amounting each to a fractional part of the width of a normal frame line; and (b) optoelectronic scanning means, which precede the processing station and are spaced from the latter by a plurality of frame lengths and are adapted to measure the light transmission of the film at least in a plurality of scanned areas distributed over the width of the frames, each of which scanned areas has in the longitudinal direction of the film a dimension which is a fractional part of the width of a normal frame line, said optoelectronic scanning means being adapted to deliver an analog voltage which represents the accumulated light transmission which has been measured, (c) an analog-to-digital converter for digitalizing the analog voltage, and (d) digital data-processing means for receiving the digital data received from the analog-to-digital converter during each step of the advance of the film and for receiving signals representing the speed at which the film is advanced or other parameters, and for deriving control signals from the data received data and for delivering said control signals to the processing station.

In a preferred embodiment, an electronic window is provided between the optoelectronic scanning means and the analog-to-digital converter and is adapted to deliver to the analog-to-digital converter only voltages in a predetermined range.

BRIEF DESCRIPTION OF THE DRAWING

FIG. 1 is a diagrammatic top plan view showing apparatus which embodies the invention and serves to carry out the method in accordance with the invention.

FIG. 2 is a side elevation showing the mechanical elements of the apparatus shown in FIG. 1.

DETAILED DESCRIPTION OF THE PREFERRED EMBODIMENT

In the apparatus shown in the drawing a reversal film 1 is advanced in the direction indicated by the arrow 2. The film 1 comprises frames 1a separated by black frame lines 1b. The film 1 is advanced in steps having a length which is a fractional part of the width b of a normal frame line 1b. The film is advanced by a film transport mechanism 3, which comprises a step motor 4, which drive the film by means of a drum 5, against which the film is urged by a plurality of elastic pressure-applying rollers 6. Said rollers 6 contact the periphery of the drum 5 laterally of the film 1 and through the perforations of the film.

The leading end of the film is received by a mounting station 7, which comprises a cutting mechanism 8 and deflecting means 9. In that mounting station, the film 1 is positioned with properly located frame lines and is cut into individual frames. Usable film pieces are elimiated, if desired, and the usable frames are delivered by the guiding and deflecting means 9 to the slide frame 10, which is held in a receiving position and when it has received a film frame is automatically closed, removed from the mounting station and replaced by a new slide frame. The deflector 9 serves to deflect usable film pieces past the slide frame and to deliver usable frames to the slide frame 10. The deflector is disposed between the slide frame and the cutting mechanism 8.

The processing station 7 is preceded by optoelectronic scanning means 11, which are spaced from the processing station by more than two frame lengths. The optoelectronic processing means comprise a light source disposed on one side of the film and a plurality of light detectors, such as photodiodes, which are disposed on the other side of the film and distributed over the width h of the picture area of the film. Said light detectors deliver an analog voltage which represents the light flux which is incident on the light detector. The several voltages are summed up by a circuit 11, which via a signal line 12 delivers an analog voltage representing the accumulated light transmission. The light emitted by the light source is incident on the light receivers after it has been transmitted through the film and through a narrow slit, which extends parallel to the frame lines 1b of the film 1 and has a width which is only a fractional part of the width b of a normal frame line 1b. For this reason the accumulated light transmission of the film is always measured only in a strip-shaped area which extends at right angles to the direction of advance of the film substantially across the picture area of the film and which has a width corresponding to the width of that narrow slit. The analog voltage representing the measured accumulated light transmission is delivered to an analog-to-digital transducer via the line 12 and an electronic window 13, which will transmit only voltages in a predetermined range. By that converter the received voltage is digitalized in known manner and corresponding digital data are delivered to data-processing means 15, such as microprocessor, which receive also clock signals from the transport mechanism 3. By said data-processing means, the received data are processed in accordance with the method outlined hereinbefore so that the locations of the frame lines 1b on the film 1 are detected as the film is transported and control signals are generated, which serve to control the operation of the cutting mechanism 8 and of the deflector 9 and of other means for mounting the film, inclusive of the transport mechanism 3, in dependence on the locations of the frame lines. The data-processing means deliver said control signals via the line 16 and, if desired, also via the line 17, which is connected to the transport mechanism. It will be understood that the lines 16 and 17 will comprise channels in the number required for the transmission of input and output signals of various kinds.

The digital data delivered by the digital-to-analog converter per transport step are stored in the data-processing means 15 at least for the time required for a given point on the film 1 to move from the scanning means 11 to the cutting mechanism 8 when the film is advanced at the speed determined by the transport mechanism 3. The above-mentioned digital data will then be available for the comparison in the data-processing means at least for that time and optionally for a longer time, e.g., for the time which passes until an entire film has been transported.

We claim:

1. A method of automatically detecting the locations of the frame lines of a reversal film as it is supplied to a processing station, such as a cutting and mounting station, a notching station or the like, so that the frame lines can be used as reference marks for the positioning of the film in the processing station, wherein the film is moved past optoelectronic scanning means in steps which amount to only a fractional part of the normal width of a frame line, said optoelectronic scanning means generate an analog voltage which represents the accumulated light transmission of the film in a scanning area which extends at right angles to the direction of travel of the film substantially across the picture area of the film and has a width which is only a fractional part of a normal width of a frame line, and the extreme value of said voltage obtained during a scanning of at least one normal frame length and corresponding to the lowest light transmission is evaluated as a representation of the light transmission of the scanned film at a frame line, characterized by (a) digitizing the analog voltage and storing the digital data obtained for each step of travel for an interval of tiem which corresponds to the travel over a plurality of frame lengths, and (b) comparing the digital data which are stored at a time with each other and recognizing a frame line by determining digital data which represent the extreme voltage value when the number of such data which occur in an uninterrupted sequence corresponds to a frame line width, within a predetermined tolerance allowance, and recognizing an unexposed frame area if a larger number of such data occur in an uninterrupted sequence.

2. A method according to claim 1, characterized in that the location of each frame line on the film is determined by processing data representing the time of the measurement, the interval of time between the occurences of digital data groups associated with respective frame lines, and the length over which the film has traveled in the meantime.

3. A method according to claim 1, characterized in that digitizing only those analog voltages which lie in a range defined by upper and lower limits wherein said range is so selected that the extreme voltages corresponding to a normal light transmission of a frame line will lie in said range and will differ from said limits.

4. A method according to claim 3, characterized in that said voltage range is adjustable.

5. A method according to claim 1, charcterized in that the absence of light transmission is separately detected only for film areas disposed near the edges of the film.

6. A method according to claim 5, characterized in that said voltage range is so defined that the analog voltage corresponding to zero light transmission lies outside said range.

7. Apparatus for automatically detecting the locations of frame lines of a reversal film as it is supplied to a processing station, such as a cutting and mounting station, a notching station or the like, so that the frame lines can be used as reference marks for the positioning of the film in the processing station, the apparatus comprising:

(a) a film transport mechanism for longitudinally advancing the film in steps amounting each to a fractional part of the width of a normal frame line;

(b) optoelectronic scanning means, which precede the processing station and are spaced from the latter by a plurality of frame lengths, for measuring the light transmission of the film at least in a plurality of scanned areas distributed over the width of the frames, each of which scanned areas has in the longitudinal direction of the film a dimension which is a fractional part of the width of a normal frame line, said optoelectronic scanning means generating an analog voltage which represents the accumulated light transmission which has been measured, (c) an analog-to-digital converter for digitalizing the analog voltage, and (d) digital data-processing means for receiving the digital data received from the analog-to-digital converter during each step of the advance of the film and for receiving signals represnting the speed at which the film is avanced or other parameters, and for deriving control signals from the data received data and for delivering said control signals to the processing station.

8. Apparatus according to claim 7, characterized in that an electronic window is provided between the optoelectronic scanning means and the analog-to-digital converter and is adapted to deliver to the analog-to-digital converter only voltages in a predetermined range.

* * * * *